United States Patent [19]

Vasquez

[11] 4,055,255

[45] Oct. 25, 1977

[54] MEASURED MATERIAL DELIVERY APPARATUS AND METHOD

[76] Inventor: Jose Arthur Vasquez, 2963 Champa St., Denver, Colo. 80205

[21] Appl. No.: 656,581

[22] Filed: Feb. 6, 1976

[51] Int. Cl.$^2$ ............................................. G01G 19/10
[52] U.S. Cl. ........................................ 214/2; 177/141; 177/147; 214/146 E; 222/272
[58] Field of Search ................... 214/2, 146 E, 701 R, 214/701 P, 508, 509; 177/139, 141, 147; 222/272

[56] References Cited

U.S. PATENT DOCUMENTS

| | | | |
|---|---|---|---|
| 1,023,752 | 4/1912 | Oswalt | 222/272 X |
| 1,704,425 | 3/1929 | Bruning | 214/146 E |
| 2,851,171 | 9/1958 | Martin | 214/2 |
| 2,917,196 | 12/1959 | Hastings | 214/701 P |
| 3,273,730 | 9/1966 | Moore | 214/146 E |

*Primary Examiner*—Robert J. Spar
*Assistant Examiner*—George F. Abraham
*Attorney, Agent, or Firm*—Ancel W. Lewis, Jr.

[57] ABSTRACT

Apparatus and method for delivering a measured amount of material to a receiving area includes a dispensing bucket on a carriage assembly that is pivoted about a horizontal axis on the free end of a vehicle-supported boom adapted to scoop up the material from a supply. The bucket has a central, restricted discharge opening with a controlled movable closure and further has an auger that gradually moves controlled amounts of the material out through the discharge opening for the controlled dispensing of the material from the bucket over a limited area. The carriage assembly has a carriage body on which the bucket is mounted so that the bucket is moved up and down relative to a carriage frame to further position the bucket relative to the end of the boom and achieve greater bucket heights above the end of the boom. The bucket is suspended on a weighing mechanism in the form of a hydraulic cylinder supported on the carriage frame that is used to selectively elevate the bucket relative to the carriage frame above an at-rest position and the pressure in the hydraulic cylinder is sensed by a pressure gauge that is marked to indicate the weight of the material in the bucket. The vehicle moves the bucket to pick up the material in a scooping action, the bucket is positioned upright and the contained material is weighed, and excess amounts of the material are dispensed from the bucket until a selected measured quantity remains. The measured quantity is then delivered to a receiving area, the bucket is raised to a discharge point above the receiving area, if necessary, and the measured material is dispensed through the restricted discharge opening into the receiving area.

4 Claims, 8 Drawing Figures

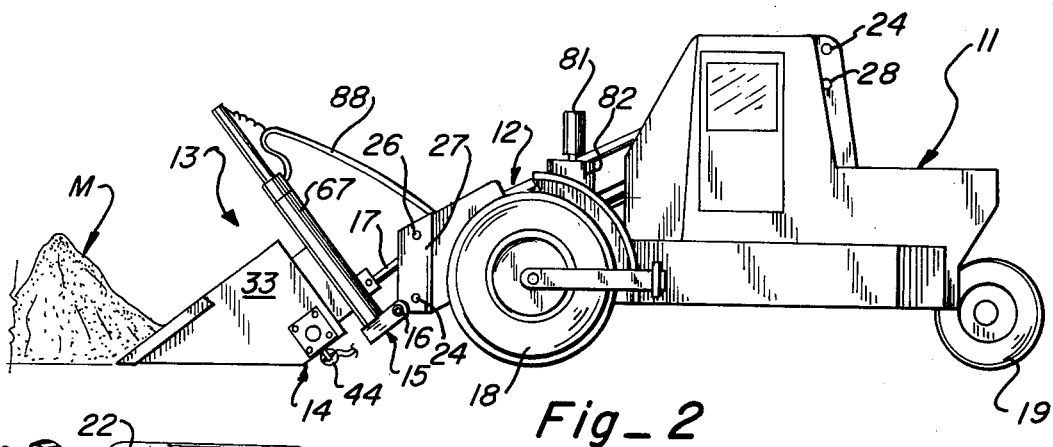
Fig_2
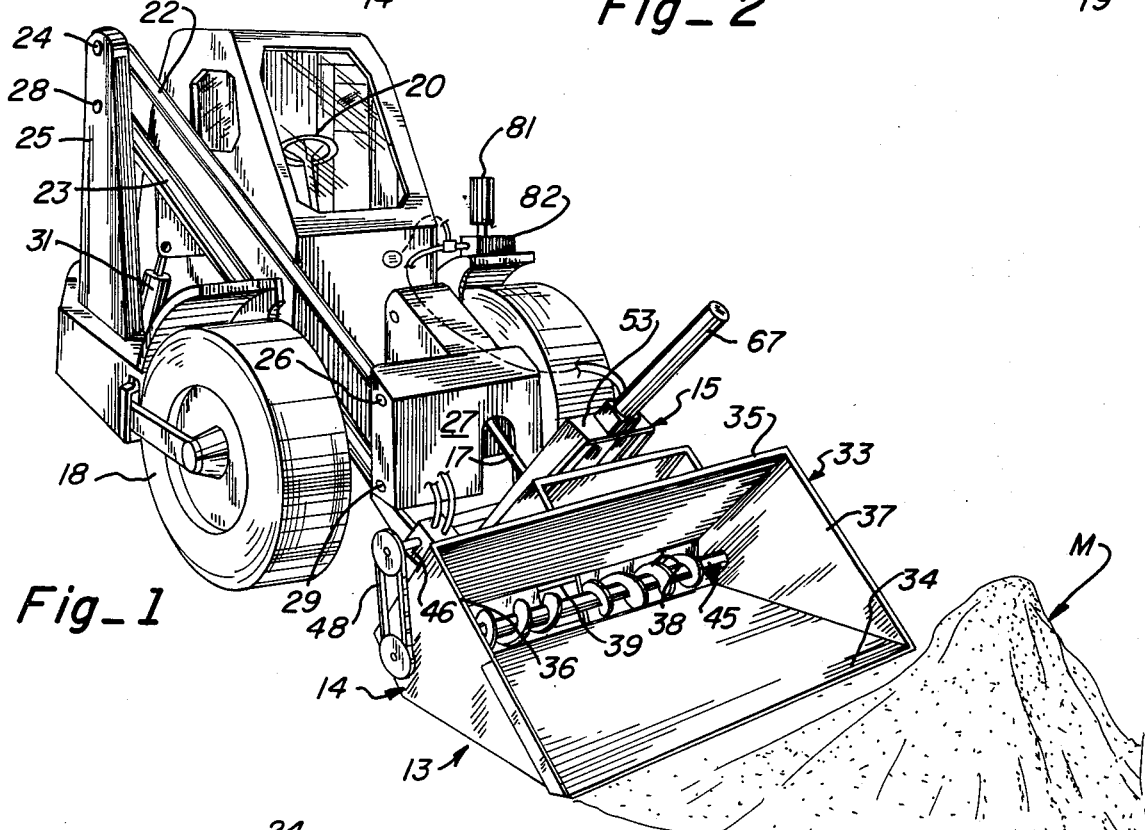
Fig_1
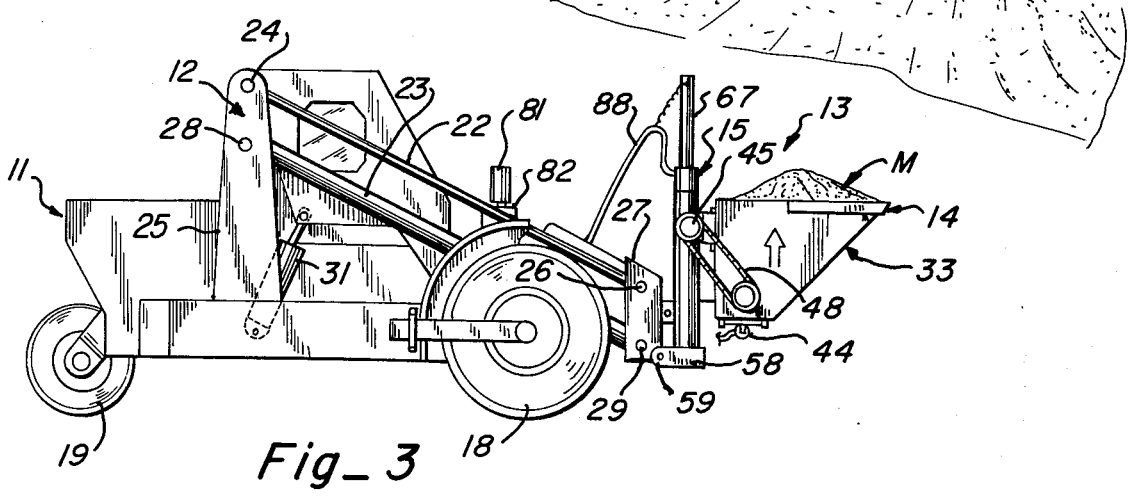
Fig_3

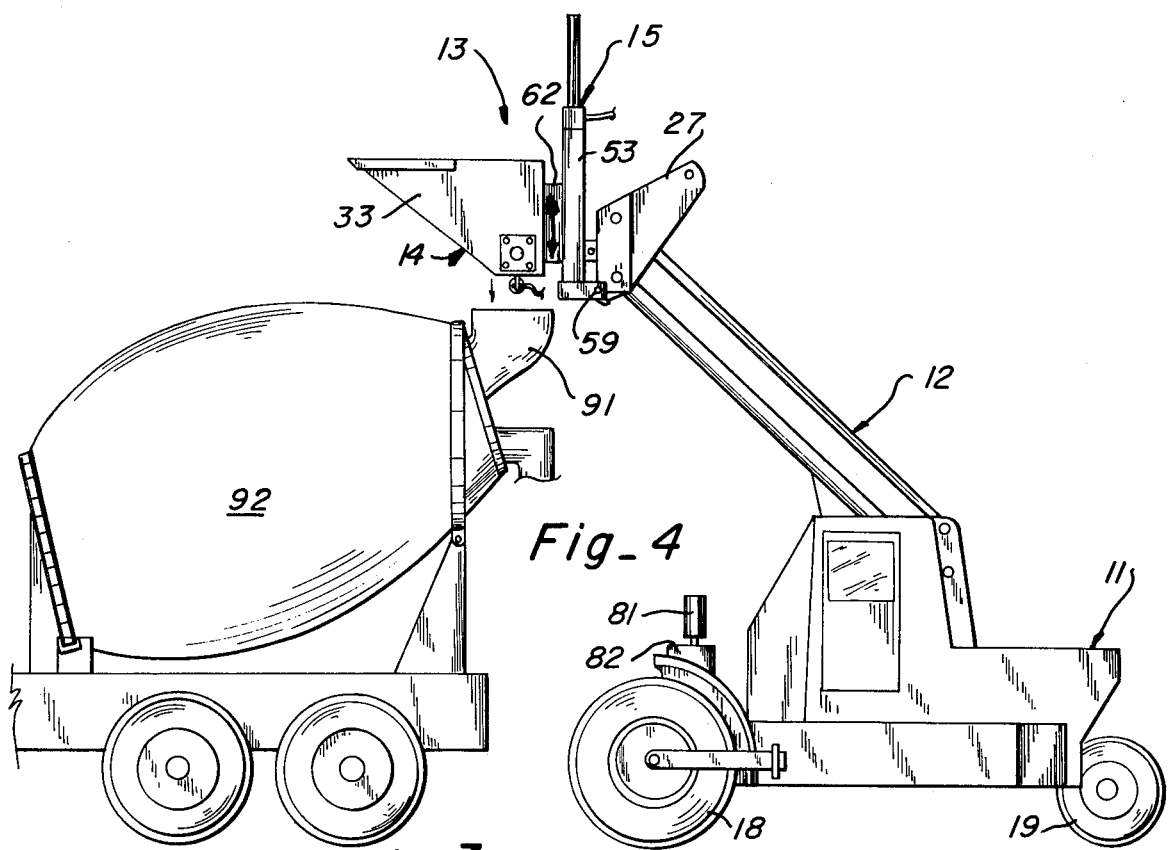
Fig_4
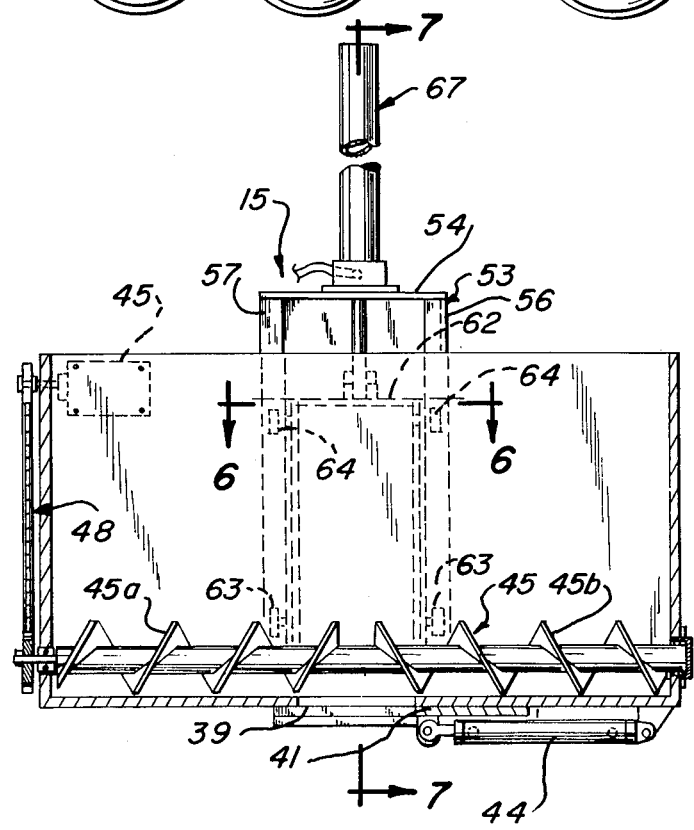
Fig_5
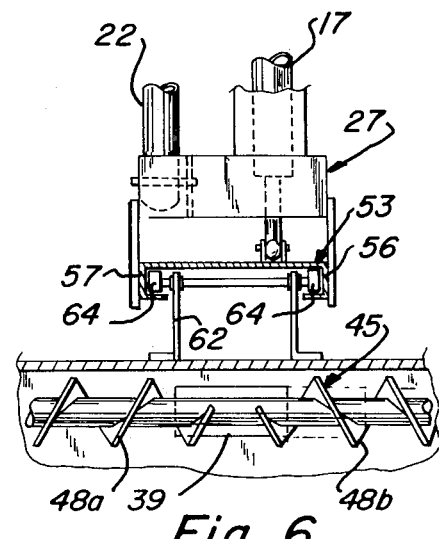
Fig_6

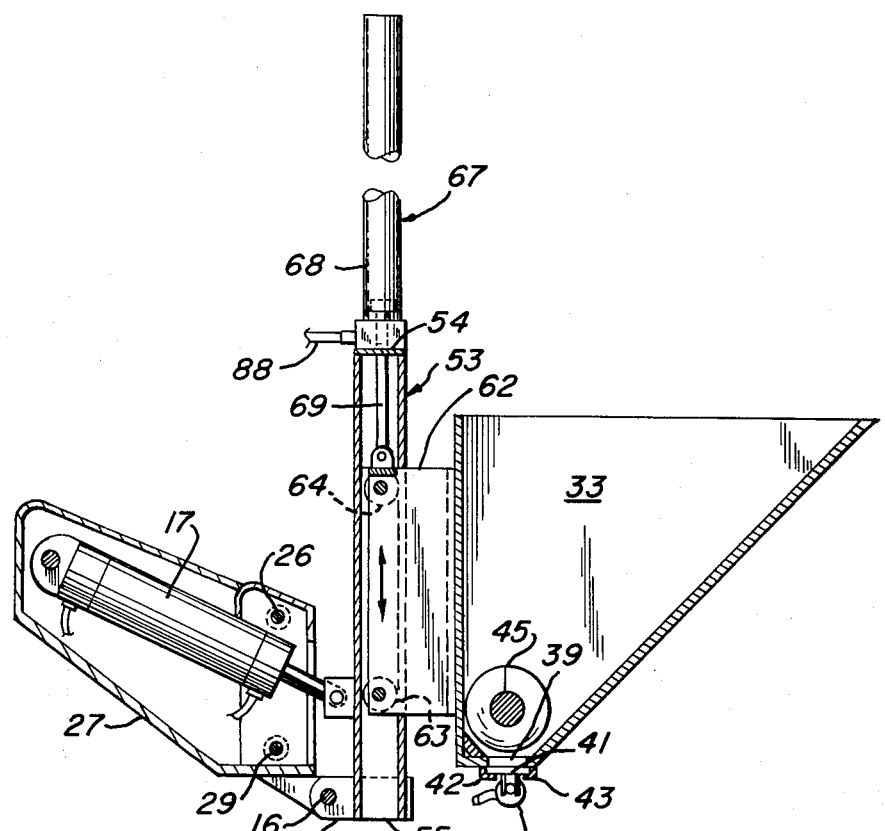
Fig_7
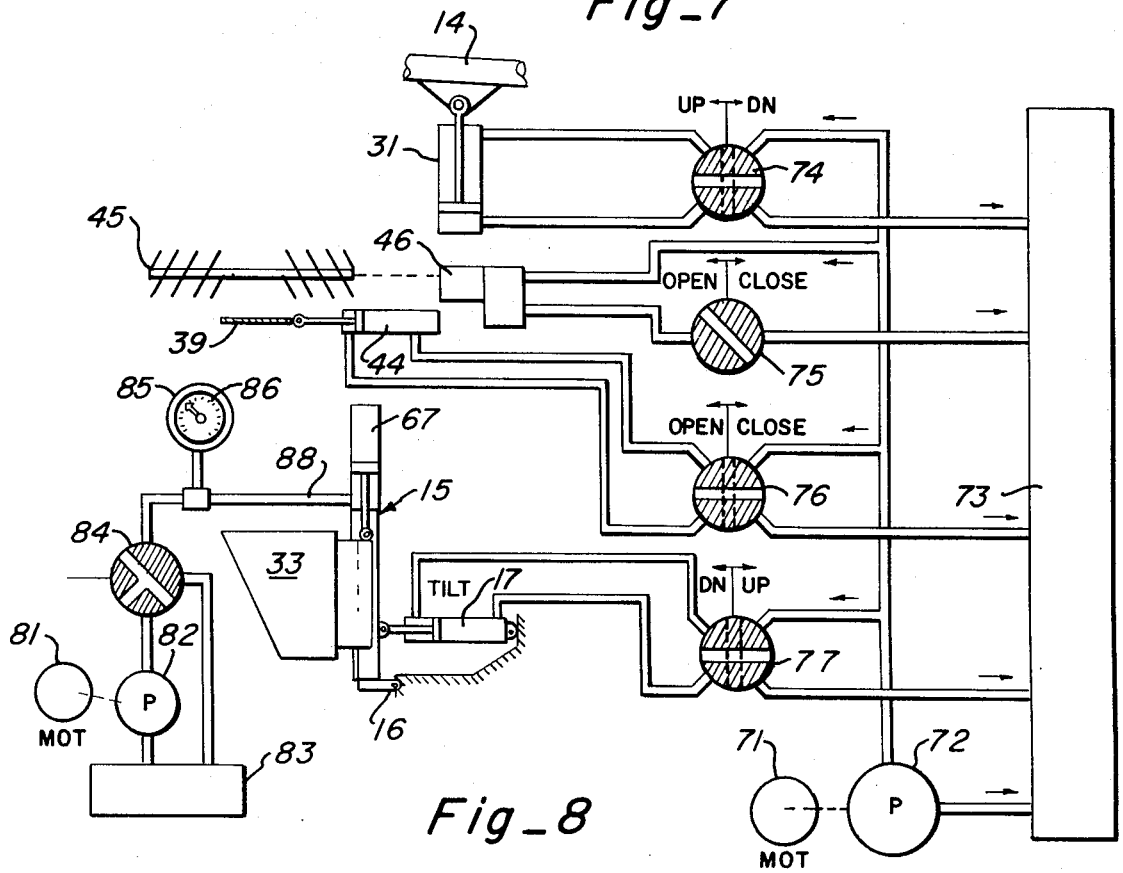
Fig_8

MEASURED MATERIAL DELIVERY APPARATUS AND METHOD

FIELD OF THE INVENTION

This invention relates to a novel apparatus and method for delivering a measured amount of material in a controlled dispensing stream to a selected receiving area.

BACKGROUND OF THE INVENTION

Solid particulate materials such as sand, gravel, cement, grain, fertilizer and the like are usually stored in a bulk quantity and it is necessary to deliver them to a designated area in measured amounts. There are many different types of apparatus and methods presently in use that are suitable for collecting, measuring and delivering a measured quantity of a material to a receiving area. Equipment that is frequently utilized includes a front end loader or a like vehicle, conveyors, and storage and controlled dispensing bins. For example, the material is stored in a stockpile, front end loaders are used to move the material from the stockpile to a conveyor where it is moved by one or more conveyors up and into the top of a storage and dispensing bin. The material is then discharged from the bin in measured quantities onto a truck, loader bucket or the like, which in turn dumps the measured amount of material at a receiving area. For some applications it is desirable to be able to discharge the material into a relatively small receiving area and closely control the rate of discharge.

The present invention is a substantial departure from the above-described prior practice and is considerably simpler in that it eliminates the necessity of costly conveyors, a storage and dispensing bin, and measuring equipment usually associated with a storage and dispensing bin, as well as the considerable space required to perform this practice.

The above prior known practice and procedure are frequently employed in cement measuring and mixing operations which are carried out in what is commonly referred to as a cement batch plant. This plant functions to deliver measured amounts of sand, gravel, and cement to a concrete mixer. The present invention is particularly suitable for replacing a conventional concrete batch plant in that it may be used to deliver weight-measured amounts of sand, gravel and cement into the hopper of a concrete mixer on a truck or the like and is herein described at some points with reference to a concrete mixing operation to illustrate its utility for that particular application. It is understood, however, that this is only by way of example and illustration and that the present invention is applicable to the delivery of a measured amount of other forms of materials in a variety of applications such as for use in the delivery of grain, fertilizer, chemicals, and like flowable materials.

Accordingly, an object of the present invention is to provide a simple yet highly effective apparatus and method for delivering a measured quantity of a material in a controlled discharge stream to a specific receiving area.

Another object of the present invention is to provide an apparatus and method for delivering a measured quantity of a material to a receiving area where it is then dispensed under controlled conditions and over a specific limited receiving area and an elevated receiving area if required.

Still another object of the present invention is to provide apparatus that is readily attached to the end of a boom on a vehicle that is capable of collecting, measuring and dispensing a flowable material such as sand, gravel, cement, grain, fertilizer or the like.

A further object of this invention is to provide a novel apparatus and method that may be used as a substitute for a conventional cement batch plant in delivering measured quantities of cement, sand and gravel into the hopper of a concrete ready-mix truck or the like.

Yet a further object of this invention is to provide an apparatus and method for delivering a measured amount of a material characterized by the picking up of the material, measuring the material picked up by weight by gradually dispensing excess quantities from that picked up unitl a desired weight remains, and then dispensing the material in controlled amounts through a restricted opening into a receiving area.

A further object of the present invention is to provide novel measured material delivery apparatus for flowable, particulate materials and the like characterized by a dispensing bucket on the end of a carriage body that moves up and down on a carriage frame which in turn is pivotally attached to the end of a boom, the bucket being movable up and down relative to the end of the boom and having a weight mechanism and indicator for indicating the weight of the material in the bucket, with the bucket being adapted to dispense the material into a restricted receiving area.

Yet another object of this invention is to provide a novel measured material delivery apparatus that readily mounts on the end of the boom of a front end loader and vehicle and utilizes a portion of the already existing hydraulic cylinder and controls, said apparatus being powered entirely by hydraulic drive and controls associated with the hydraulic drives that are operable from the vehicle.

Other objects, advantages and capabilities of the present invention will become more apparent as the description proceeds, taken in conjunction with the accompanying drawings in which like parts have similar reference numerals, and in which:

FIG. 1 is a front perspective view of material apparatus embodying features of the present invention with the bucket in a lowered scooping position;

FIG. 2 is a side elevation view of the apparatus of FIG. 1 with the bucket in the lowered scooping position.

FIG. 3 is a side elevation view of the apparatus of FIG. 1 with the bucket in a raised travel and load weighing position;

FIG. 4 is a side elevation view of the apparatus of FIG. 1 in a raised dispensing position dispensing the load into a concrete mixing truck;

FIG. 5 is a vertical sectional view of the frame carriage and bucket assembly of FIG. 1 disposed in an upright position;

FIG. 6 is a sectional view taken along lines 6—6 of FIG. 5;

FIG. 7 is a sectional view taken along lines 7—7 of FIG. 5; and

FIG. 8 is a schematic circuit diagram of the hydraulic drive and control system for the hydraulic cylinders shown in FIGS. 1-7.

Referring now to the drawings, in FIGS. 1-4 there is shown a vehicle 11 having a side-mounted boom 12 that supports measured material delivery apparatus 13 constructed in accordance with the present invention which in general is made up of a bucket and dispensing assembly designated generally by numeral 14 supported by a carriage assembly designated generally by numeral 15 which in turn is pivotally mounted on the free end of the boom 12. The measured material delivery apparatus shown is in a form that readily attaches to the front or free end support of the boom 12 and is mounted thereon so as to be tiltable or pivotal about a horizontal axis at pivot 16. The apparatus then is moved or powered by a two-way hydraulic cylinder 17 in a manner similar to that of the bucket of a front end loader, as will be described more fully hereinafter.

The vehicle 11 and boom 12 shown and some of the hydraulic drive system hereinafter described are typical of the type of heavy equipment that is commonly in use to power a front end loader. The vehicle shown has a pair of front wheels 18 and a rear wheel 19 that pivots in response to the turning of a steering wheel 20.

The boom 12 shown has an upper arm 22 and a lower arm 23 arranged in a parallelogram configuration and pivotally connected at the ends. The upper arm is pivoted at the rear at pivot 24 on an upright rear end support 25 and is pivoted at the front at pivot 26 on a front end support 27. In turn, the lower arm 23 is pivoted at pivot 28 on the rear end support 25 and pivoted at pivot 29 on the front end support 27. A two-way hydraulic cylinder 31 is provided to raise and lower the boom in a conventional manner.

The bucket and dispensing assembly designated by numeral 14 comprises a bucket 33 which as shown is of the type that is commonly used as the bucket on a front end loader. This bucket 33, as viewed in side elevation when disposed upright, has a forwardly and upwardly inclined front wall 34, a rear wall 35, a pair of opposed side walls 36 and 37 and a bottom wall 38. This provides a generally V-shaped configuration as seen in a side elevation. The front wall 34 is arranged to be tilted down and move parallel to and along the ground and in contact therewith in the down or lowered position, as shown in FIGS. 1 and 2. The bottom wall 38 has a central discharge opening 39 of a limited width so that the discharge from the bucket is limited to only a small part of the entire area of the bottom of the bucket and is confined to the central part of the bottom of the bucket 33.

A slidable closure 41 for the discharge opening 39 is arranged to slide in a pair of guides 42 and 43 and this closure is moved between open and closed positions to any of a selected number of positions to vary the size of the discharge opening from a maximum size to a completely closed arrangement. The closure 41 is moved back and forth by a two-way hydraulic cylinder 44.

An auger 45 is mounted for rotation in the bottom of the bucket 33 which has a set of convolutions 45a on one side of the bottom opening and a set of convolutions 45b on the other side of the discharge opening whereby upon rotation of the auger controlled amounts of the material in the bucket are controllably directed inwardly toward and dispensed through the discharge opening 39. The auger convolutions are closely positioned to the bottom wall of the bucket to dispense substantially all of the material from the bucket via said dispensing opening. A hydraulic motor 46 is mounted on the side of the bucket and is coupled by pulleys and a belt to drive the auger, the motor being selectively controlled by the driver so that the motor rotates the auger to dispense the material from the bucket during dispensing for leaving a measured amount in the bucket and for dispensing the entire contents into a receiving area as required.

The carriage assembly 15 comprises a frame 53 of a generally box-shaped, open construction having a top member 54, a bottom member 55, and opposed spaced side members 56 and 57 affixed together at the corners. The bottom member 55 has a rearwardly projecting ear 58 at each side. Each ear 58 is pivotally connected at pivot 16 to the lower forward end of the front end support 27 of the boom 12 whereby the lower rear end of the carriage frame 53 pivots or tilts about a horizontal axis relative to the outer lower front end of the boom 12.

The carriage is comprised of a carriage body 62 having a spaced pair of lower rollers 63 and a spaced pair of upper rollers 64. These rollers are mounted on respective shafts supported by the carriage body and are supported and guided by the frame at each side thereof. The bucket 33 in turn is affixed to the front of the carriage body 62 and the carriage movement moves the bucket up and down with the rear wall thereof moving parallel to the carriage frame 53 as the carriage rollers move in and are guided by the side members 56 and 57 of the frame 53. The carriage body in its lowest position is at rest on the carriage frame and moves up and down in relation to the at-rest position. The hydraulic cylinder 17 used for tilting the bucket and carriage about pivot axis 16 has its movable rod and piston portion connected to the back side of the carriage body 62, as best seen in FIGS. 6 and 7.

For performing both the function of moving the bucket 33 up and down relative to the carriage frame 53 and for sensing the weight of the contents or load in the bucket 33 there is provided a hydraulic cylinder 67. This cylinder is mounted on the top of the frame 54 ans has its stationary cylinder portion 68 extending above the frame and its movable rod and piston portion 69 connected to the top of the movable carriage body, as best seen in FIGS. 6 and 7. In this arrangement the movable rod and piston portion 69 retracts into the cylinder portion 68 as the bucket is raised.

Referring now to FIG. 8, there is shown in a schematic form the motive power and control system to selectively move the boom 14, auger 45, closure 39 and bucket 33. The boom, auger, closure, and tilt or pivot action for the bucket are powered by a common hydraulic supply illustrated as a motor 11, pump 72 and storage tank 73 connected in the conventional way. The pump supplies fluid under pressure to a control valve 74 for selectively controlling the fluid to the boom hydraulic cylinder 31 to raise and lower the boom 31, a control valve 75 for selectively controlling the fluid to a hydraulic motor 46, a control valve 76 for selectively controlling hydraulic fluid under pressure to the hydraulic cylinder 44 for the closure 39, and a control valve 77 controlling hydraulic fluid under pressure to the hydraulic cylinder 17 for pivoting or tilting the bucket 33. The pump 72 is shown to supply fluid under pressure over separate lines to each of the control valves and a separate return line returns fluid to the tank 73.

The bucket elevating and weighing hydraulic cylinder 67 is shown as powered by a separate hydraulic pressure source including a motor 81, pump 82 and tank 83 with a control valve 84 for regulating fluid flow to and from the hydraulic cylinder 67 and back to the tank 83. A pressure gauge 85 is shown in FIG. 8 as mounted on the pressure side to register the pressure required to raise the bucket so that the weight of the bucket is proportional to the gauge pressure. The gauge 85 has indicia 86 indicating the weight of the material in the bucket 33.

Considering now the procedures used for delivering measured material with the apparatus hereinabove described, the bucket 33 is first positioned by actuating boom hydraulic cylinder 31 and moving the boom 12 down to lower the bucket and the tilt hydraulic cylinder 17 is actuated to tilt the bucket forward so that the bucket is in the lowered scooping position as shown in FIGS. 1 and 2. The vehicle 11 advances the bucket 33 into a pile of material designated M to load the bucket in an operation like that of a front end loader.

The tilt hydraulic cylinder 17 is then actuated to pivot the bucket 33 to a vertical or upright position and the lift hydraulic cylinder 67 is then actuated to raise the carriage body 62 and bucket 33 above the lower at-rest position on the carriage frame 53. This produces a pressure in the lower portion of the hydraulic cylinder 67 below the piston that is proportional to the weight of the load in the bucket and a weight is indicated on the scale of pressure gauge 85. To remove an excess of the material from the bucket and reach a desired weight, the bucket bottom closure 41 is moved to an open position by actuating hydraulic cylinder 44 and actuating the hydraulic motor 46 to drive the auger 45 to dispense the unwanted material in closely controlled amounts through the discharge outlet 39 until a desired material weight is achieved in the bucket as indicated on weight meter 85, at which time the closure 41 is returned to the closed position.

The vehicle then moves the loaded bucket with the measured quantity to a receiving area in the travel position shown in FIG. 3. The bucket may be in an at-rest position with the carriage body resting on the carriage frame or the carriage elevated above the frame by actuation of the lift cylinder 67 for the travel position.

Once a receiving area is reached, the boom 14 is raised by actuating hydraulic cylinder 31 and actuating hydraulic cylinder 67 if the necessary height is required to raise the carriage body and bucket relative to the carriage frame, as shown in FIG. 4. This may be required for moving elevated receiving areas. Once the discharge outlet of the bucket is above a receiving receptacle, shown as the hopper 91 of a readymix cement truck 92, the contents of the bucket are dispensed by first actuating the closure cylinder 44 to open the closure and then actuating the motor 46 to drive the auger whereby the measured material is positively dispensed out the discharge opening 39 into the hopper 91. In the event the material in the bucket is moist or tends to stick to the inside of the bucket, it can readily be jarred or rocked loose by the actuation of the boom hydraulic cylinder. The sequence is then repeated for delivering another measured quantity of material.

As above discussed, it has been found that the abovedescribed apparatus and method is highly effective in delivering measured amounts of sand, gravel and cement into the hopper of a ready-mix type cement truck. In this operation each is scooped up, weighed, moved to a position above the hopper as shown in FIG. 8, and dispensed in a controlled stream into the hopper. Water is then added in the truck receptacle according to the weight of the materials delivered. The additional height afforded by the carriage body movement relative to the carriage frame, in addition to affording an accurate way of measuring weight, allows close positioning over even the tallest known cement truck hopper. In addition the relatively small, centrally disposed outlet ensures that all of the material is dispensed into the hopper. This apparatus, then, can be used as a replacement for a cement batch plant for many cement mixing operations and particularly where small quantities of mixed cement are required for a relatively small job.

Although the present invention has been described with a certain degree of particularity, it is understood that the present disclosure has been made by way of example and that changes in details of structure may be made without departing from the spirit thereof.

What is claimed is:

1. Measured material delivery apparatus comprising, in combination:

a self-propelled vehicle;

a boom mounted on and projecting out from said vehicle;

a first selectively controlled, two-way hydraulic cylinder arranged to raise and lower the boom between a lowered scooping position, a raised travel and weighing position and a further raised dispensing position;

a carriage assembly including a frame mounted at the end of the boom for pivotal movement about a horizontal axis and a carriage body movable up and down relative to said frame;

a second selectively controlled, two-way hydraulic cylinder coupled between said boom and said frame for moving said frame about a horizontal axis;

a bucket mounted on said carriage body for conjoint movement with said carriage body and for being positioned by said boom, said bucket having a centrally disposed dispensing opening in the bottom of a selected restricted size;

a closure member for said dispensing opening adapted to move between a closed and an open position;

a third selectively controlled hydraulic cylinder arranged for selectively moving said closure member between said open and closed positions, a fourth selectively controlled hydraulic cylinder mounted on said frame and coupled to said carriage body for raising and lowering the bucket relative to said frame;

a fluid pressure indicating gauge coupled to said fourth hydraulic cylinder so that the weight of the load in the bucket elevated by said fourth hydraulic cylinder is reflected as pressure on the indicating gauge that is calibrated to indicate the weight of the load of the material in the bucket;

a dispensing auger in the bottom of said bucket driven by a selectively controlled hydraulic motor for moving controlled amounts of a load of material collected in the bucket toward and through said dispensing opening until a selected weight remains and for dispensing substantially all of said weighed material through said discharge opening into a selected receiving area below said discharge area when said boom is in said raised dispensing position.

2. Measured material delivery apparatus as set forth in claim 1 wherein said vehicle has a cab for a driver and said hydraulically controlled cylinders are selectively operated from within said cab.

3. Measured material delivery apparatus as set forth in claim 1 wherein said frame has a pair of opposed sides that form a guide for a set of upper and lower rollers on said carriage body.

4. Measured material delivery apparatus as set forth in claim 1 wherein said hydraulic motor is operated by a separate source of fluid pressure and control from that of said hydraulic cylinders.

* * * * *